Nov. 27, 1923
R. C. BAKER
PITMAN END
Filed July 20, 1922
1,475,531
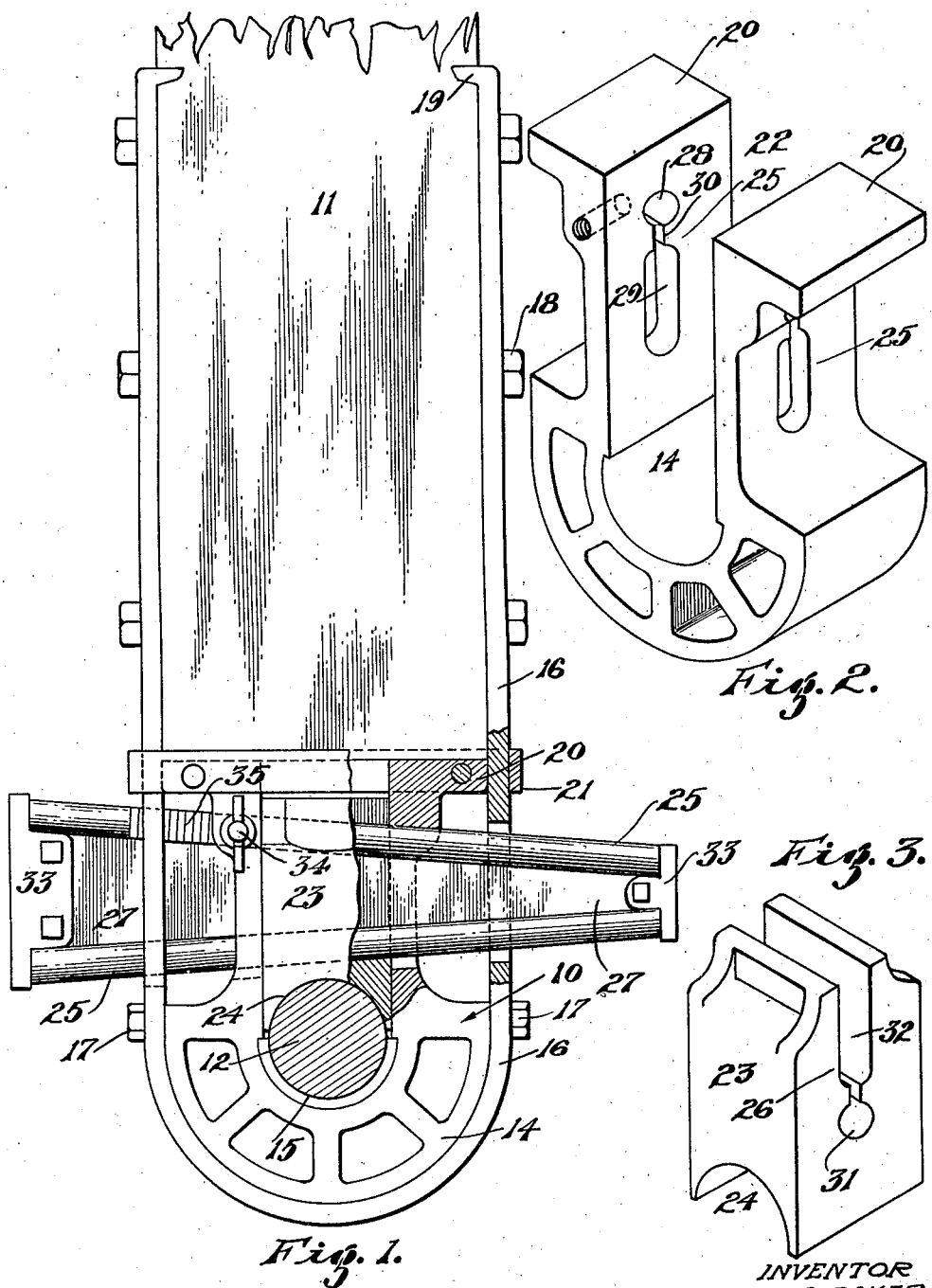
INVENTOR
REUBEN C. BAKER
BY Dewey, Strong, Townsend & Loftus
ATTYS.

Patented Nov. 27, 1923.

1,475,531

UNITED STATES PATENT OFFICE.

REUBEN C. BAKER, OF COALINGA, CALIFORNIA, ASSIGNOR TO BAKER CASING SHOE COMPANY, OF LOS ANGELES, CALIFORNIA.

PITMAN END.

Application filed July 20, 1922. Serial No. 576,333.

*To all whom it may concern:*

Be it known that I, REUBEN C. BAKER, a citizen of the United States, residing at Coalinga, county of Fresno, and State of California, have invented new and useful Improvements in Pitman Ends, of which the following is a specification.

This invention relates to bearings for walking beam pitmans.

It is the object of the present invention to provide an improved form of pitman bearing which is simple in construction and which may be easily and quickly adjusted to take up any wear which may occur in its bearing seat.

The invention contemplates the use of a bearing structure which may be secured at the end of pitman, the structure embodying a crank pin bearing seat and a cap therefor, the latter being adjustable in relation to the seat and easily adjusted to take up wear between the bearing surfaces.

One form which the invention may assume is exemplified in the following description and illustrated by way of example in the accompanying drawings, in which:

Fig. 1 is a view in elevation disclosing the preferred embodiment of my invention.

Fig. 2 is a perspective view of the bearing block.

Fig. 3 is a similar view of the bearing cap or follower block.

Referring more particularly to the drawings, 10 indicates a bearing structure adapted to be secured to the end of a pitman 11, for connecting the latter to a crank or wrist pin 12. The bearing structure comprises a bearing block 14 having a bushed bearing seat 15 formed therein. This block is rigidly fastened in position at the end of the pitman by a strap 16 which is secured to the block by cap screws 17 and to the pitman by bolts 18. The terminating ends of the strap 16 are formed with inturned lugs 19, which, when the device is assembled on the pitman, are embedded in opposite sides of the pitman as shown. In this position they co-operate with the bolts 18 to firmly secure the strap in position.

As shown in Figs. 1 and 2, the bearing block 14 is formed with integral foot flanges 20 intended to abut against the end of the pitman when the device is in position. The flanges are riveted to a strap collar 21 which circumscribes the pitman and is secured thereto.

The bearing block 14 is formed with a central guideway 22 having parallel sides for the reception of a follower block or bearing cap 23. The latter is formed with a seat portion 24 serving as the upper half of the wrist or crank pin bearing. It should be stated that the follower block is mounted in the guideway for movement toward and away from the bearing seat formed in the block 14. Such movement or adjustment is provided for the purpose of taking up any wear which may occur in the bearing surfaces of the seats.

For the purpose of imparting movement to the follower block in a controlled amount, a wedge key 25 is provided. To accomplish this function the key co-operates with tapered slots 25 and 26 formed in the block 14 and the follower 23 respectively. The key is preferably formed with a web portion 27 having its longitudinal edges formed somewhat cylindrical. The edges mentioned are guided, one in the follower block and one in the bearing block 14. It will be seen by referring to Fig. 2, that the opening 25 formed in the block 14 is formed with a guideway 28 at the top which communicates with a slotted opening 29 by a narrow passageway 30. The upper round edge of the wedge key is guided in said circular guideway 28, the web of the key passing through the narrow passage 29. It will be noticed that the opening 26 formed in the follower block is formed just the reverse of that formed in the block 14. In other words, a guideway 31 is formed lowermost in the opening 26 in the follower block and a slotted opening 32 formed uppermost. The lower round edge of the wedge key is guided in the guideway 31.

As before stated the openings 25 and 26 are tapered, and to the same degree as the wedge key. As the upper round edge of the key is guided in the guideway 28 in the stationary block 14, and the lower edge thereof guided in the movable follower block 23, longitudinal adjustment of the wedge will adjust the follower block in relation to the bearing seat in the block 14. In other words, the further the wedge key is driven into the slots 25 and 26, the closer the relation of the respective bearing seat in the follower block and the seat in the block 14. Similarly, if the wedge key is partly withdrawn, the distance between the said seats will be increased.

Means are provided to prevent the accidental removal of the wedge key, comprising caps 33 secured one at each end of the key. As these caps will not pass through the openings 25 and 26, to completely remove the key, it is necessary to first remove the cap from the smaller end thereof.

To maintain the adjustment between the seats in the follower block and the block 14, it is obvious that the wedge key must be maintained in a set position. To accomplish this, a set screw 34 is provided. This member threadedly engages a tapped hole formed in the block 14 in alignment with the circular guideway 28. When the wedge key is in a desired position the set screw may be threaded through said opening until it engages one of a plurality of serrations formed in the upper edge of the wedge key as shown at 35. This will firmly clamp the key in position.

In use, the various parts of the structure may be constructed along the lines illustrated. The strap 16 may then be secured to the bearing block 14 and bolted to the pitman 11 with the wrist or crank pin in place. The follower block may then be positioned in the guideway 22 and seated on the crank pin. The wedge key is then inserted in the openings 25 and 26, and driven therethrough until the desired fit between the bearing seats and the crank or wrist pin has been arrived at. The set screw 34 may then be tightened to clamp the wedge key in place. The device is then in condition for use.

Should it be desired to take up any wear that may occur in the bearing seat, the set screw 34 is loosened and the wedge key driven through the openings. This adjusts the follower block relative to the seat in the block 14. When the wear has been taken up the set screw 34 may be repositioned to maintain the wedge key in place.

From the foregoing it is obvious that the device here disclosed while simple in construction provides a very efficient and desirable pitman bearing. The same is easy to adjust and comparatively inexpensive in regards to manufacturing costs.

While I have shown the preferred form of the invention, it is to be understood that various changes in the construction, combination and arrangement of parts may be made by those skilled in the art, without departing from the spirit of the invention.

Having thus described my invention, what I claim and desire to secure by Letters Patent is:

1. A bearing structure comprising a bearing formed with a seat, a guide extending from each side of the seat, a follower block slidably mounted between said guides for movement toward and away from the seat and adapted to serve as a bearing cap for the seat, registering tapered openings formed through said guides and said follower block, a tapered wedge key insertible through said openings, and co-operating means formed on the wedge key and in said openings adapted to cause the follower block to positively move toward or away from the bearing seat when said key is moved longitudinally.

2. A bearing structure comprising a bearing formed with a seat, a guide extending from each side of said seat, a follower block slidably mounted between said guides and adapted to serve as a cap for said seat, registering tapered openings formed through said bearing and said follower block, the opening in said bearing having a guideway formed at the uppermost end thereof, the opening in said follower block having a guideway formed at the lowermost end thereof, a wedge key having guide rails engageable with said guideways and adapted to co-operate therewith to positively adjust said follower block relative to the seat in said bearing when said wedge key is longitudinally adjusted.

3. A bearing structure comprising a bearing formed with a seat, a guide extending from each side of said seat, a follower block slidably mounted between said guides and adapted to serve as a cap for said seat, registering tapered openings formed through said bearing and said follower block, the opening in said bearing having a guideway formed at the uppermost end thereof, the opening in said follower block having a guideway formed at the lowermost end thereof, a wedge key having guide rails engageable with said guideways and adapted to co-operate therewith to positively adjust said follower block relative to the seat in said bearing when said wedge key is longitudinally adjusted, and means for retaining said wedge in a set position.

4. A bearing structure comprising a bearing formed with a seat, a guide extending from each side of said seat, a follower block slidably mounted between said guides and adapted to serve as a cap for said seat, registering tapered openings formed through said bearing and said follower block, the opening in said bearing having a guideway formed at the uppermost end thereof, the opening in said follower block having a guideway formed at the lowermost end thereof, a wedge key having guide rails engageable with said guideways and adapted to co-operate therewith to positively adjust said follower block relative to the seat in said bearing when said wedge key is longitudinally adjusted, serrations formed in one of said guide rails, and a set screw mounted in said bearing engageable with said serrations to maintain said wedge in a set position.

REUBEN C. BAKER.